United States Patent [19]

Friberg et al.

[11] 3,813,974

[45] June 4, 1974

[54] APPARATUS FOR CUTTING OF STEEL CORD FOR TIRES

[75] Inventors: John Inge Ronnie Friberg; Sture Fingal Esaias Fritjofsson, both of Gislaved, Sweden

[73] Assignee: N. V. Veluwse Machine Industrie, Netherlands

[22] Filed: Sept. 13, 1972

[21] Appl. No.: 288,805

[30] Foreign Application Priority Data
Sept. 14, 1971 Sweden ............................ 7111623

[52] U.S. Cl. .................. 83/155, 83/240, 83/247, 83/276, 83/451, 83/559, 83/613, 83/925 R
[51] Int. Cl. ............................................ B65h 17/36
[58] Field of Search ............. 83/155, 276, 409, 451, 83/358, 268, 614, 240, 247, 613, 925 R, 559; 271/74

[56] References Cited
UNITED STATES PATENTS

| 3,234,836 | 2/1966 | Buff .................................. 83/451 X |
| 3,269,242 | 8/1966 | Hooper et al. ..................... 83/276 X |
| 3,463,040 | 8/1969 | Pouilloux .......................... 83/614 X |
| 3,701,297 | 10/1972 | Kovic ................................ 83/276 X |
| 3,726,169 | 4/1973 | Gazuit .............................. 83/276 X |

*Primary Examiner*—Frank T. Yost
*Attorney, Agent, or Firm*—Ladas, Parry, Von Gehr, Goldsmith & Deschamps

[57] ABSTRACT

Apparatus for cutting of steel cord in strips for tires, characterized by the fact that the band-like cord in its fore end is grasped from above by vacuum suction cups in a feeding device and is at first lifted from a feed table and is fed by a horizontal movement forward to the required length, is let down, and then by means of another series of vacuum suction cups, held from underneath in its advanced position, which latter suction cups are situated at a close distance from the final stage cutting shears of a guillotine type which are adjustable to form a desired angle to the feeding direction of the cord band, whereafter the cut-off steel cord strips are deposited on a feed-out band to be subsequently joined together and are finally rolled up in a winding machine.

4 Claims, 4 Drawing Figures

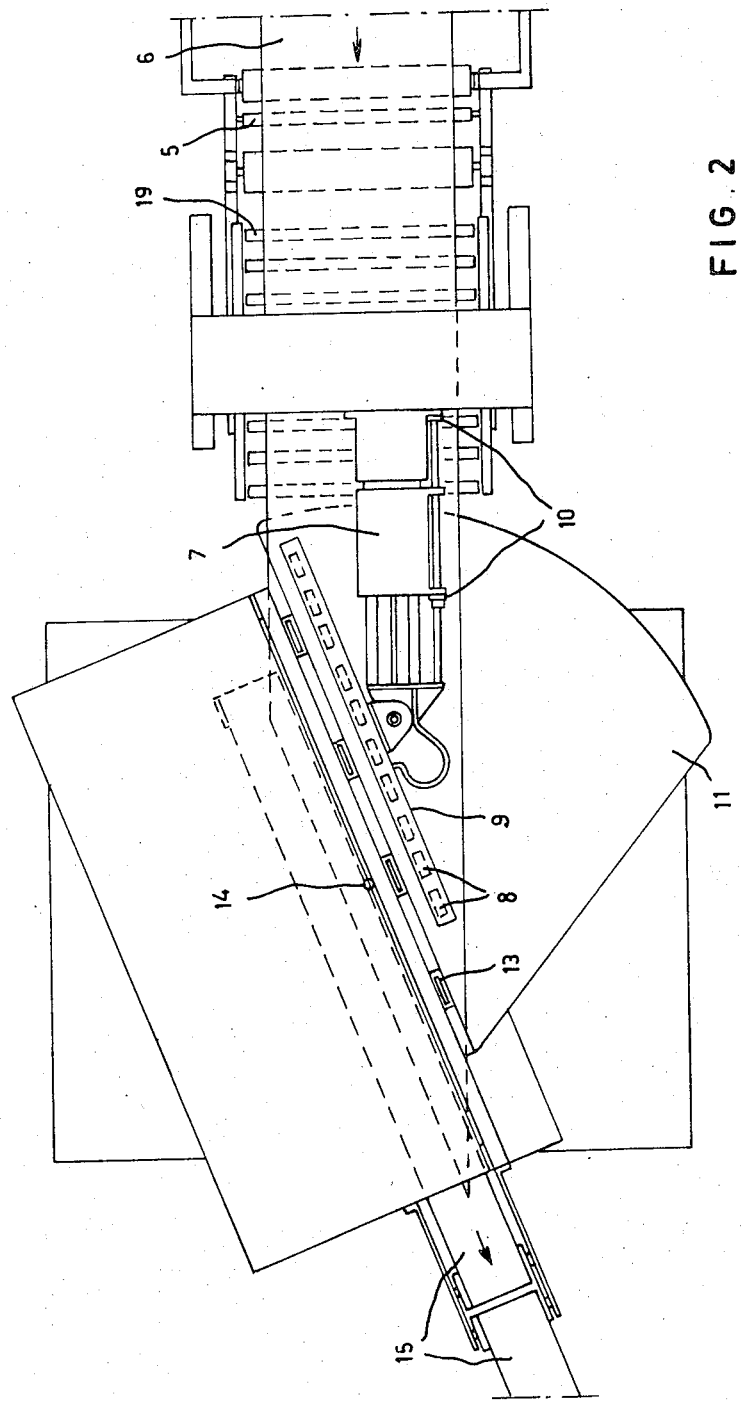

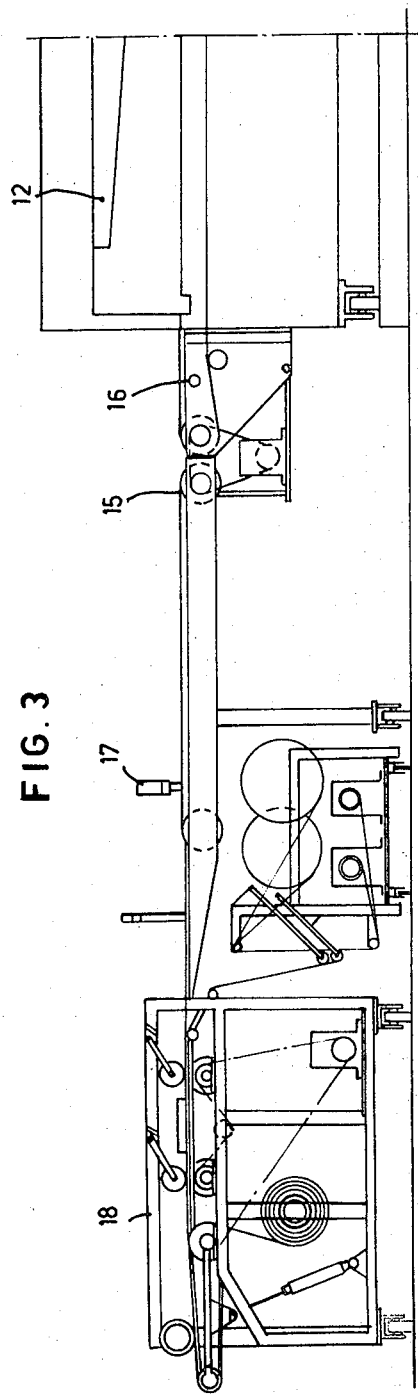
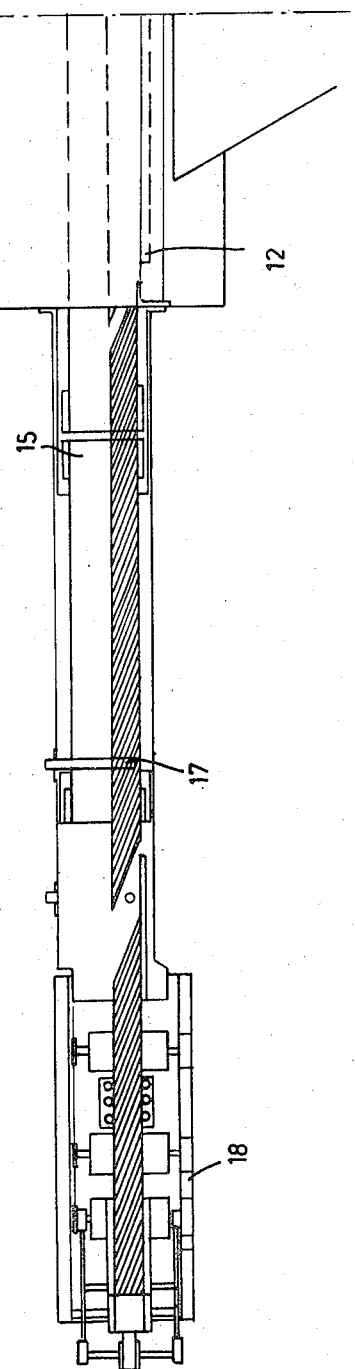

APPARATUS FOR CUTTING OF STEEL CORD FOR TIRES

BACKGROUND OF THE INVENTION

In the carcass of so-called radial or belt tires for motor cars, steel cord forms an integral part as a structural element. Such steel cord consists of closely lying parallel steel wires which are rolled in between two rubber layers. The number of wires can amount to 500–700 and the width of the rubber coated cord band to 800–1,000 mm. The manufacture is done in calender and the steel cord in the unvulcanized rubber is wound on rolls. To avoid the cord sticking between the layers a so-called liner or a shim is put in the roll together with the same. Thus, the "steel cord" represents a plurality of steel wires embedded in rubber, that is to say a rubber sheet which is reinforced by a plurality of steel wires. The plurality of wires and their thickness depend on the application thereof. Thus for certain layers in a passenger car tire a material is used in which the wires have a thickness of about 1 mm and in which 16 wires are present per inch.

In the manufacture of belt tires the steel cords have to be cut into strips according to the tire dimension with an exact width and a definite angle with respect to the longitudinal direction. The angle in question is indicated by the tire construction itself. The cut off strips are joined together after the cutting operation by gluing to form a continuous band which is wound together with the liner into rolls which later are intended to be used in connection with the special machines for radial tires.

The cutting has until now been effected in the prior art by a conventional so-called gang slitting machine. However, this procedure has serious disadvantages. For instance, with the same feeding adjustment of the cord one gets a different width of the cut-off cord strips depending on whether the cutter by its beveling runs with or against the wires. In order to compensate for this, one is forced to have two different feeding lengths at one's disposal for one and the same strip width. As to the quality of belt tire, however, it is of great importance that the cord strips have completely even edges. The gang slitting machine unfortunately leaves a somewhat "ragged" cut — often showing a tendency of hanging-out of threads at the ends, which is particularly injurious to the life of the tire. Another drawback is that cord strips cut by the prior art are difficult to handle due to the sharp unevenness of the edges.

SUMMARY OF THE INVENTION

The present invention concerns a new apparatus especially suited for cutting of steel cord for tires of the radial type which entirely eliminates the above mentioned drawbacks and also is advantageous from the economical point of view. The cost for the supply of a cutting machine according to the invention is just only about a third of the cost for a cutting machine of the generally conventional type known in the prior art. The capacity is in both cases the same and is limited as a matter of fact by the speed, with which the operator can carry out the joining and the winding-up of the cut strips. The new apparatus according to the invention facilitates in this respect increased production speed with an advantageous economical result as consequence.

The apparatus according to the invention for cutting of steel cord in strips to be used as building elements in radial tires is characterized by the fact that the band-like cord is raised at its forward end by use of vacuum suction cups in a feeding device which grip the cord from above whereby the bandlike cord is first raised from a feed table and then through a horizontal movement is transported forwardly for the required length, is then dropped down and then through another series of vacuum suction cups - the band is held in its advanced position the last mentioned suction cups being situated at close distance from the final stage cutting shears of a guillotine type, which are adjustable to form a desired angle with the feeding direction of the cord.

BRIEF DESCRIPTION OF THE DRAWING

The apparatus with its devices according to the invention is made clear in a simple way with reference to the schematic FIGS. 1–4.

FIG. 2 shows from above the essential building up of the feeding and cutting devices within the system according to the invention;

FIG. 3 shows feeding-out band and winding-up machine in side-view; and

FIG. 4 shows feeding-out band and winding-up machine from above.

DESCRIPTION OF PREFERRED EMBODIMENT

Figure 1:
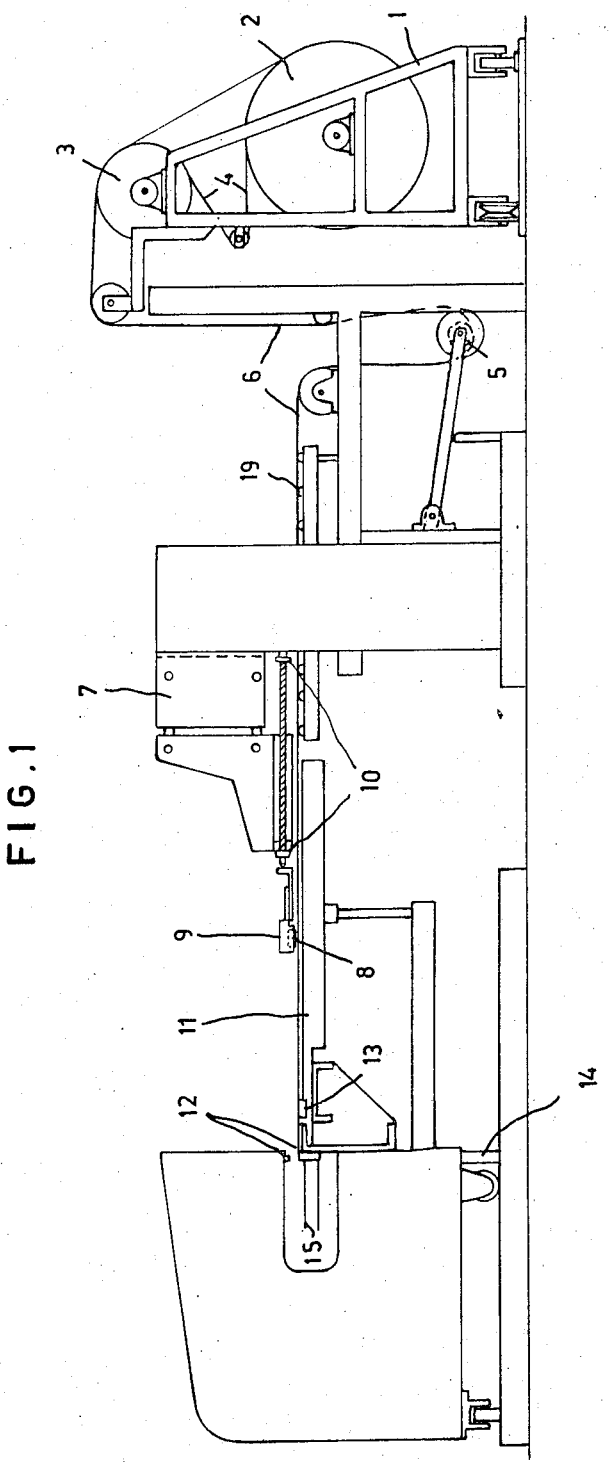
FIG. 1 shows in side-view the apparatus according to the invention.

From an unwinding stand 1 — consisting of a stand with chucks for the calendered steel cord 2 and a driven roll 3, where the liner 4 is wound up — the start and the stop of the liner winding and by that the rolling forward of the steel cord occurs with what is called a "dancing" roll 5 resting in a loop of the steel cord. When the cord is drawn out for the cutting, the dancing roll 5 is lifted, the liner winding starts, new steel cord is fed forward, the dancing roll falls, the liner winding stops and so on.

The free steel cord 6 is led via roller devices 19 forward to a feeding device 7, equipped with feeder vacuum suction cups 8 placed in a square tube 9 which is horizontally revolvable and lockably suspended in a mechanism which at first during the feeding stroke provides a vertical movement for raising of the cord and then a forward and backward movement for feeding of the cord 1. This movement forward and backward is limited by two mechanically adjustable stops 10. The feed table 11 supports the cord 6 ahead of the cutter 12. The table is preferably covered with cloth of a material which does not stick to the steel cord. Between the table 11 and the cutter 12 there is a series of suction cups 13 for holding, from underneath, of the steel cord during the cutting. The cutter 12 is of a plate shearing type (guillotine) which for the purpose is modified in such a way that the cutter including the suction cups 13 and the feed table 11 is revolvable around the center of the cutting edge 14 and lockable in the required angle, e.g., 22°, towards the feeding direction of the cord band. Directly behind the cutting edge of the shears there is a feeding-out band 15 revolvably suspended on an axle 16 so it vertically falls down when the cutting edge of the shears goes down. This revolving suspension of the band is of importance in order to enable the cut-off cord strips to leave the shears in a satisfactory condition. Adjacent the outer part of the band 15 there is a photocell 17, which senses the contrast between steel cord and band and provides impulse for starting the feeding of the cord in connection with the cutting operations.

The strips which are cut-off are joined together by an operator manually and are wound in a directly connected winder 18 which is started by the operator and stopped by a pedal but at the same time so far is supervised by a photocell in such a way that the winder can only be driven when a steel cord strip lies on the joint table and in such a way that the winder stops when the strip is rolled on. The winder is on a stand with wheels in order to allow change of the angle of the cutter, with which it is firmly connected.

The feeding and cutting operations can be summarized in the following way:

By impulse from the photocell 17 on the feeding-out band 15 from the cutter 12, when previous strips has been fed out and the shears blade is on the top, the square tube 9 with the suction cups 8 goes down and siezes the steel cord 6. At achieved vacuum the tube 9 lifts with the cord from the bedding and the device makes its stroke, the size of which is determined by the stop 10. At the finished stroke the suction cups 13 grasp from underneath the cord. The suction tube 9 releases on the upper side, raises and goes back to the starting position at the same time as the shears cut. The cut strip falls down onto the feeding band 15 from the cutter 12 and is transported out to winding machine 18 after passage under the photocell 17 and duly joining.

What is claim is:

1. Apparatus for cutting steel cord into strips for use in radial or belt tires, comprising a. a feed table for horizontally supporting steel cord coming from a continuous source of supply,
   b. a feeding device having feeder suction cups adapted to be engaged with and disengaged from the forward end of the upper surface of the steel cord,
   c. means for moving the engaged feeder suction cups upwardly and forwardly to advance the steel cord along the feed table and for returning the disengaged feeder cups to original position,
   d. means for controlling the length of the forward stroke of the feeder suction cups,
   e. supporting suction cups beyond the feed table for engaging and supporing the under surface of the forward end of the advanced steel cord,
   f. guillotine cutting means adjacent the supporting suction cups, said cutting means being angularly adjustable with respect to the direction of feed, and
   g. a feed-out band beyond the cutting means for removing severed strips of steel cord.

2. Apparatus according to claim 1, in which said feeder suction cups are mounted in a row and means are provided for angular adjustment of the row with respect to the direction of feed.

3. Apparatus according to claim 1, in which the feed-out band is revolvably suspended adjacent the cutting means on an axle arranged to move downwardly on downward movement of hte guillotine member.

4. Apparatus according to claim 1, in which photoelectric means are provided responsive to the presence of severed strips on the feed-out band for controlling the successive operation of the feeder suction cups, the supporting suction cups, and the cutting means.

* * * * *